United States Patent [19]
Schindel et al.

[11] 3,783,312
[45] Jan. 1, 1974

[54] VISCOUS DECELERATION DAMPED INCREMENTAL POSITION MOTOR

[75] Inventors: Arnold Schindel, Fairlawn; David Wojtowicz, South Plainfield, both of N.J.

[73] Assignee: The Singer Company, Little Falls, N.J.

[22] Filed: Jan. 15, 1973

[21] Appl. No.: 323,843

[52] U.S. Cl. .......................... 310/36, 310/74, 310/77
[51] Int. Cl. ............................................. H02k 7/02
[58] Field of Search ................... 310/84, 92, 93, 77, 310/74, 36; 335/64, 69, 74, 90, 271, 193

[56] References Cited
UNITED STATES PATENTS
3,110,830  11/1963  Smith ..................................... 310/77
2,671,863  3/1954  Matthews ............................. 310/36

*Primary Examiner*—J. D. Miller
*Assistant Examiner*—Robert J. Hickey
*Attorney*—T. W. Kennedy et al.

[57] ABSTRACT

Damping apparatus for use in a dual position stepper motor is shown. An arm on the motor shaft rotates therewith in a recess formed in a friction plate held for limited movement between two surfaces. Damping is obtained by the arm striking an edge of the recess of the friction plate and moving it slightly to absorb the momentum of the motor and its load. Means are provided to adjust the pressure on the friction plate to allow it to be effective for different motor loads.

10 Claims, 4 Drawing Figures

VISCOUS DECELERATION DAMPED INCREMENTAL POSITION MOTOR

BACKGROUND OF THE INVENTION

This invention relates to stepper motors in general and more particularly to a damping apparatus for use in a two-phase dual position stepper motor.

Stepper motors and similar devices which provide stepping a shaft through incremental rotations are well known in the art. Typically, operation of the stepper motor is accomplished by selectively energizing one of a plurality of stator poles in the motor which will in turn cause a magnetic (which may be a permanent or electric magnet) core on the rotor shaft to align itself with the field generated by the energized pole. In this way, the shaft can be stepped through various discreet positions. Typically, these motors operate in an undamped mode and thus an oscillation will occur before they settle down at the selected position. Initially, the rotor will overshoot, then be pulled back, overshoot, and so on until it finally settles out. In a great many applications, such oscillations are of little consequence. One method of damping that has been used in the prior art is that of shorting the pole opposing the one being energized. Although this results in adequate damping, it also creates an undesirable side effect, in that it slows down the response of the stepper motor to the input exitation. In some applications neither the oscillation nor the slow response time caused by this prior art method can be tolerated. An example of such an application is in mail sorting apparatus where a stepper motor is used to switch a flow of mail between one of two possible paths. In this application, a fast response with as short a settling time as possible is required.

SUMMARY OF THE INVENTION

The apparatus of the present invention provides good dampening without affecting the response time of the motor. An arm is secured to the end of the motor shaft and is allowed to move between the two positions of the stepper motor within a recess. The recess is formed inside a stop plate which is mounted to the case in such a manner that it is free to move slightly under the force of the arm coming against it. In this way it can absorb the energy of the moving arm and effectively damp it. Adjusting nuts provide means to adjust the pressure on the stop plate, thereby regulating its friction and the amount of damping which results. In this way, the system may be adjusted to handle various inertial loads on the motor shaft. Upon absorbing the force from the arm when being positioned in one direction, the stop will be slightly offset so that when the arm goes back in the other direction, it will be required to move a small distance thereby increasing the damping effect. Hard stops are also provided to prevent excessive overtravel should the stop plate be mis-adjusted. In some devices hard stops precede the magnetic rest position so that there is a greater tendency for the shaft to remain fixed in either position with greater stiffness than is afforded magnetically when the poles are aligned.

BRIEF DESCRIPTION OF THE DRAWINGS

FIG. 4 is a partial sectional view of a second embodiment of the present invention.

DETAILED DESCRIPTION OF THE PREFERRED EMBODIMENT

Figure 1:
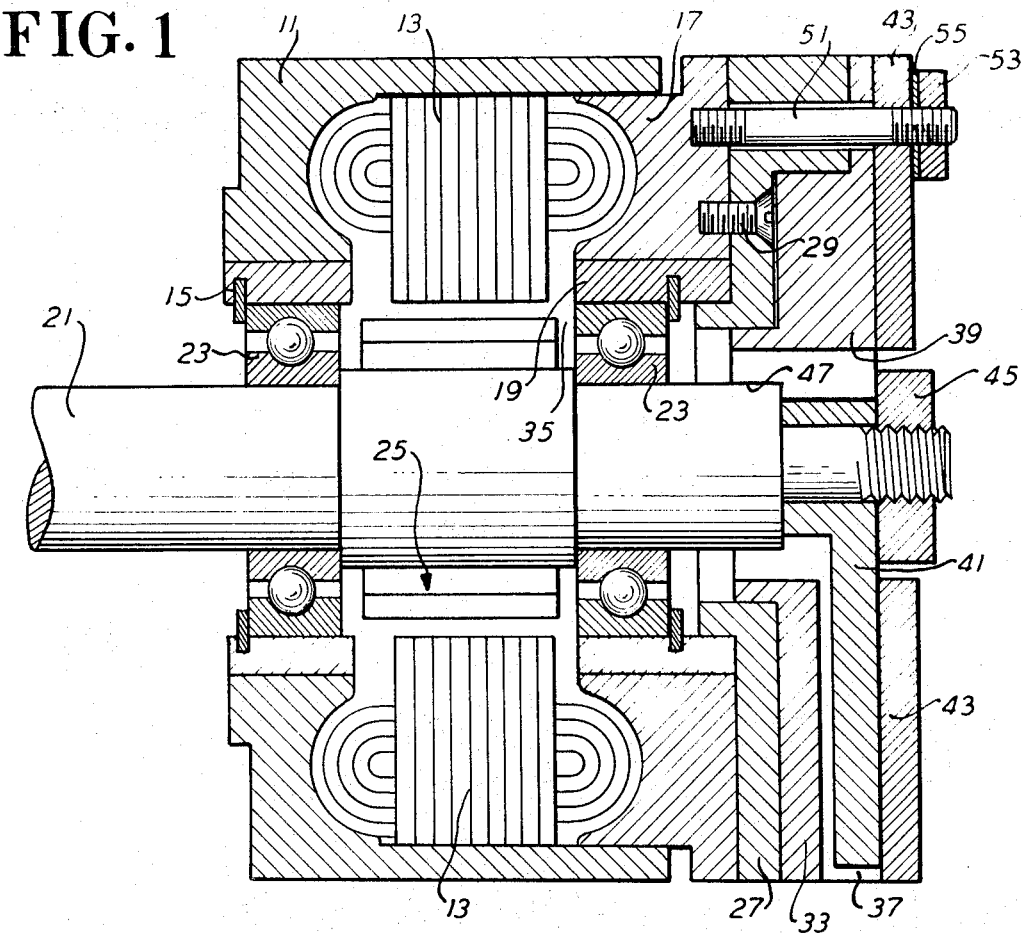
FIG. 1 is a cross-section view of a stepper motor having the preferred embodiment of the invention mounted thereto.
Figure 2:
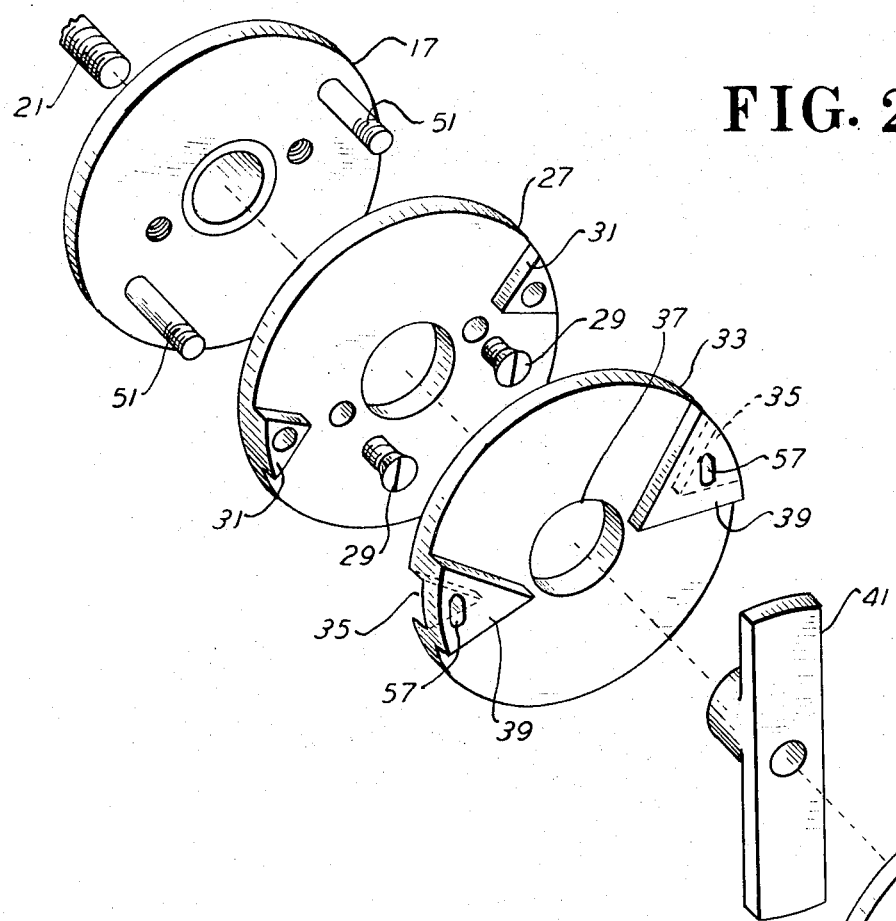
FIG. 2 is a exploded view of the preferred embodiment of the present invention.
Figure 3:
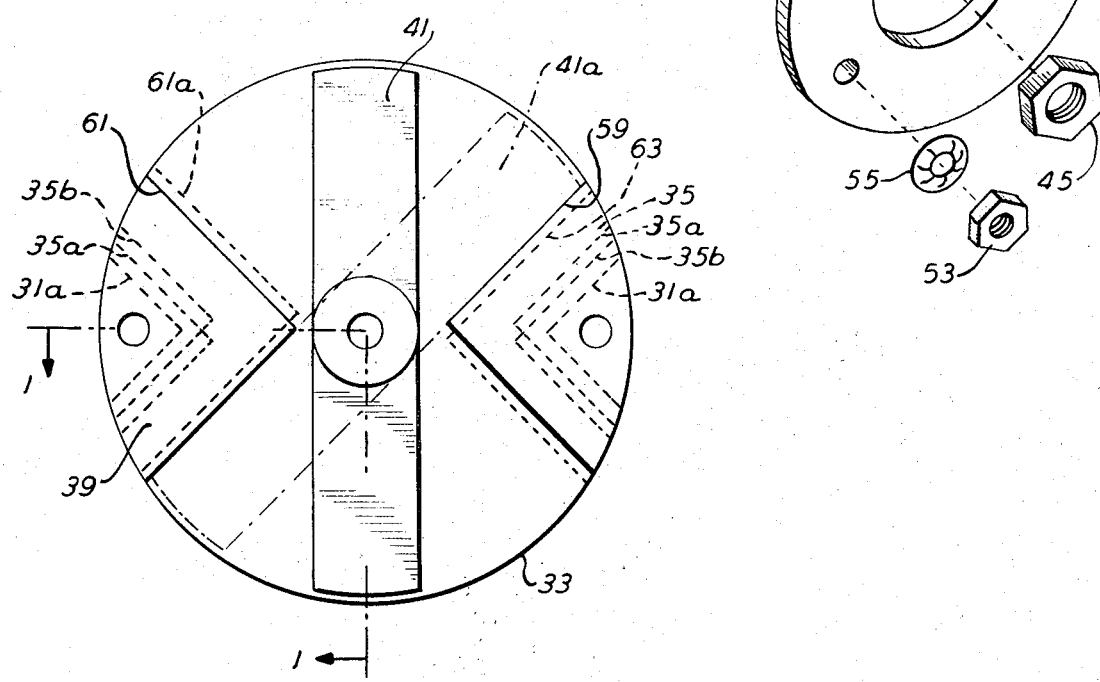
FIG. 3 is an end view illustrating operation of the present invention.

FIG. 1 is a cross-sectional view of the motor with the dampening apparatus attached taken as shown by the end view of FIG. 3 to illustrate the cross section at portions 90° from one another. A conventional motor housing 11, will have two pairs of poles with a single laminated core 13 mounted within it in conventional fashion such as by cementing. Press fitted into the end of casing 11 is a bearing sleeve 15. The other end of housing 11 has cemented or press fitted to it a cover 17 which similarly has a second bearing sleeve 19 press fitted into it. The motor-rotor 21 is supported by bearings 23 placed in each of the bearing sleeves 15 and 19. Mounted to the rotor shaft 21 will be a magnetic core 25 which will interact the the poles 13 in conventional manner to cause the rotor to go from one position to another depending on which of the poles 13 is energized. The apparatus so far described is a conventional stepper motor well known in the art. The remainder of the description will deal with the damping mechanism which constitutes the present invention, and is illustrated by the remainder of FIG. 1 and by FIG. 2. A stop plate 27 is fastened to the end plate 17 with screws 29 inserted through holes in the stop plate 27 and screwed into threaded holes in the end plate 17. Stop plate 27 has on opposite ends two pie-shaped stops 31. Placed over the stop plate 27 is a friction plate 33. Friction plate 33 contains two pie-shaped recesses 35 of a size slightly larger than pie-shaped stops 31 so that the stops may be inserted therein and the friction plate is free to rotate within pre-determined limits before coming against one of the stops 31. The other side of friction plate 33 contains an opened portion 37 and two raised stop portions 39. An arm 41 is secured to the shaft 21 of the motor and is free to rotate between the stops 39. Placed over friction plate 33 is cover 43. Arm 41 is held on to shaft 21 by a nut 45 which will firmly hold it against a shoulder 47 on the shaft for rotation therewith. Two studs 51 are screwed into threaded holes in the end plate 17 and the stop plate 27, the friction plate 33 and the end plate 43 are held thereon in suitable holes by nuts 53 and Belleville washers 55. The holes 57 in friction plate 33 through which the studs 51 extend are slotted to permit limited rotation of the friction plate 33. By adjusting the nuts 53 against the washers 55, the amount of compression of friction plate 33 between stop plate 27 and cover plate 43 may be adjusted. Friction plate 33 should be of a material which has a predictable friction performance and long life under friction conditions. An example of such material is PENLON, a type of teflon material available from the Dixon Corp. of Massachusetts.

Operation of the damping device may best be seen from examining FIG. 3. The arm 41 is shown in a neutral position which is half way between the one energized position and the other energized position, which in turn are 30° apart. (30° is used here as an example. The actual angle will depend on the particular design requirements of the motor.) In the one energized position the arm would be as shown by dotted lines 41A, that is, it would be resting against the edge 59 of the stop on friction plate 33 as shown in solid lines. Similarly, when in the other position, the arm 41 would be in a position aligned with the solid line 61 of the other stop 39 of the friction plate 33. The tension on bolts 53 is adjusted such that when the arm 41 is moved from a position where it is aligned with line 61 to the position 41A shown on dotted lines it will cause the friction plate 33 to move so that the stop 39 is now as shown by the dotted line outline 63. This will result in only a slight overshoot and the arm 41 will quickly return to the position 41A and remain there. The line 61 will now be as shown by dotted line 61A. When the arm 41 is returned to the other position, this means it will meet the stop 39 before it reaches its desired position, i.e. aligned with the line 61. This will allow the friction plate 33 to absorb some of the energy of the arm and the load on the shaft and be pushed slightly past the line 61A and quickly damp out. The position of the stops on stop plate 27 are shown by dotted lines 31A and the positions of the recess in friction plate 33 by the two sets of dotted lines 35A and 35B. Within the limits of travel as shown, these stops will not be reached. However, if for some reason nut 53 is too loose the stops 31 will prevent any large amount of overshoot by the arm 41.

A partial section of an alternate embodiment is shown in FIG. 4. In this embodiment the end plate 17 has a tubular extension which extends out beyond the arm 41 and is threaded on the inside of its outer end. A friction plate 63 of construction similar to friction plate 33 is placed between the end piece 17 and the arm 41 with its projecting portions 39 extending out past the arm 41. The primary difference in the friction plate 63 is that rather than having recesses 35 for the fixed stops it will have kidney-shaped recesses 65, which will fit over pins 67 embedded in the end plate 17. One or more friction washers 69 are held against the projection of the friction plate 64 by a Belleville washer 71 which is against a nut 73 inside the threaded portion of the end plate 17. Adjustment of this nut 73 permits adjusting the compression of the friction plate in the same manner as nuts 53 permit compression in the embodiment of FIGS. 1 and 2.

Thus, a damping mechanism for a stepper motor or the like in which a friction plate movable a small amount engages an arm on the end of the motor shaft to cause damping has been shown. Although a specific embodiment has been described, it will be obvious to those skilled in the art that various modifications may be made without departing from the spirit of the invention, which is intended to be limited solely by the appended claims.

We claim:

1. In a stepper motor having a shaft rotatable between two positions in response to selected inputs, apparatus to damp the motion of the shaft when arriving at one of the two positions comprising:

a. a friction plate placed against an end of the motor concentric with the motor shaft said friction plate having a pair of projections which have facing edges spaced by an angular amount substantially equal to the angular spacing between the two shaft positions;

b. an arm attached to the motor shaft for rotation therewith and positioned so as to rotate between said facing edges; and c. means to hold said friction plate against said end, said means having provisions to adjust the pressure with which said plate is held.

2. The invention according to claim 1 and further including means to provide at least one projection from said end and an elongated recess in said friction plate fitting over said projection to permit limited rotation of said friction plate.

3. The invention according to claim 2 wherein said means to provide at least one projection comprises a stop plate secured to said end and having at least one projection thereon and said means to hold said friction plate comprises a cover plate concentric with said friction plate and means to hold said cover plate against said friction plate.

4. The invention according to claim 3 wherein said holding means comprise a pair of studs screwed into said end and passing through holes in said stop plate, through slotted holes in the projecting portions of said friction plate and holes in said cover plate, and a Belleville washer and nut screwed onto the end of each of said studs.

5. The invention according to claim 1 wherein said arm projects in both directions along a diameter of the shaft and said projections on said friction plate are pie-shaped.

6. The invention according to claim 4 wherein said stop plate contains two pie-shaped projections diametrically opposed and said friction plate contains two pie-shaped recesses on the side of the plate opposite and under said pie-shaped projections of a size slightly larger than said stop plate pie-shaped projections.

7. The invention according to claim 2 wherein said means to provide at least one projection comprises a pin embedded in said end and said recess in said friction plate is kidney-shaped.

8. The invention according to claim 7 wherein said end contains a tubular projection having an inside thread at the outermost part, inside of which said friction plate is placed and said means to hold said friction plate comprises at least one friction washer contacting the projections on said plate, a Belleville washer contacting said friction washers and a nut screwed into said threads against said Belleville washer.

9. The invention according to claim 1 wherein the shaft has a narrow threaded portion on its end forming a shoulder and said arm contains a hole which is placed over said end and held against said shoulder by a nut screwed onto the end of the shaft.

10. The invention according to claim 1 wherein said friction plate is made of PENLON.

* * * * *